United States Patent [19]

Delueg

[11] Patent Number: 5,128,710

[45] Date of Patent: Jul. 7, 1992

[54] INSTRUMENT FOR THE POINT-BY-POINT MEASURING OF COLOR ORIGINALS TO BE COPIED

[75] Inventor: Verner Delueg, Vahrn, Italy

[73] Assignee: Durst Phototechnik GMBH, Bozen, Italy

[21] Appl. No.: 573,180

[22] PCT Filed: Dec. 18, 1989

[86] PCT No.: PCT/EP89/01559

§ 371 Date: Nov. 6, 1990

§ 102(e) Date: Nov. 6, 1990

[87] PCT Pub. No.: WO90/07728

PCT Pub. Date: Jul. 12, 1990

[30] Foreign Application Priority Data

Dec. 29, 1988 [IT] Italy .................... 6724/88[U]

[51] Int. Cl.$^5$ ............................ G03B 27/80
[52] U.S. Cl. ...................... 355/38; 355/71; 355/68
[58] Field of Search .......... 355/32, 35, 38, 77, 355/71, 68; 358/76, 80

[56] References Cited

U.S. PATENT DOCUMENTS 4,018,526  4/1977  Schroter ............... 355/68
5,041,866  8/1991  Imoto .................. 355/38

FOREIGN PATENT DOCUMENTS

3512744A1  9/1985  Fed. Rep. of Germany.
3706657A1  2/1987  Fed. Rep. of Germany.
2515370   10/1973  France.

Primary Examiner—Richard A. Wintercorn
Assistant Examiner—D. Rutledge
Attorney, Agent, or Firm—Cahill, Sutton & Thomas

[57] ABSTRACT

A measuring instrument for the point-by-point measuring of color originals to be copied for the determination of exposure data, in which the original is illuminated by a condenser light source by way of a Fresnel lens and by means of an objective is imaged over the whole surface on a measuring plane in which a photodiode line can be moved in a straight line over the measuring surface. The movement of the photodiode line over the original image takes place step-by-step by means of a step motor, light measuring signals being created in the individual diodes which each can be assigned to a certain measuring point on the original. The sensing takes place sequentially for the basic colors red, green and blue, in which case one color filter respectively of the corresponding color is introduced into the path of the measuring rays. From the large number of measuring values, the exposure data are computed according to a predetermined algorithm.

6 Claims, 1 Drawing Sheet

INSTRUMENT FOR THE POINT-BY-POINT MEASURING OF COLOR ORIGINALS TO BE COPIED

TECHNICAL FIELD

In general, this invention relates to the field of color exposure of photographic emulsion carriers when producing copies of a film original. In particular, the invention relates to a measuring arrangement for the point-by-point measuring of photographic originals, that are to be copied, for the purpose of determining the exposure values when copying the original by means of a photographic enlarging and copying apparatus.

BACKGROUND OF THE INVENTION

During photographic copying, it is generally customary to measure the individual originals before the exposure with respect to their density and color distribution and to determine from the measuring results the required exposure for each of the three color emulsions of the copying material which results in a copy of the original to be copied that is true to the original colors. The process used for this purpose is based on the so-called principle of the integration to gray which assumes that the colors of a copy integrate to neutral gray over the whole image surface because the scene of the picture taken typically contains the same proportions of all three basic colors red, green and blue. Because of this principle, a constant equilibrium of color is maintained in the copies if the exposure aims at maintaining a constant relationship of the basic-color proportions in the copying light.

The measuring of an original to be copied is therefore limited to a color-selective measuring of the integral transmission density in the colors red, green and blue and their comparison with that of a reference original for which the exposure values are already determined in order to carry out corresponding corrections of the exposure values as a function of a miscellaneous deviation. The method of operation virtually has the aim of producing, for a number of originals to be copied, the same color equilibrium that the reference original has.

For the integral density measuring of originals to be copied, light measuring instruments, commonly called color analyzers, are available which are predominantly used in combination with photographic enlarging and copying apparatuses. In this case, for the homogenizing of the measuring light, a diffusing lens is introduced into the projection light shining through the original and the light intensity in the individual basic colors in the copying plane is measured by means of a color-selective measuring probe.

The integral measuring process has the advantage that it is simple because the measuring device which is required for this purpose is relatively simple and the carrying-out of the measurement, particularly the positioning of the measuring probe, is not critical. However, the integral analysis on the basis of the mean color density of the original is found to be unsatisfactory in a case in which the image to be reproduced has a strong dominant color. In such a case, the criterion of always restoring in the copy the color equilibrium of the reference original in reality results in a adulteration of the color of the copy in comparison to the original. At least in some of the originals to be copied, the integral measurement results in an unsatisfactory color reproduction which requires a repetition of the exposure with correspondingly corrected exposure values. The object of obtaining a yield of satisfactory first copies that is as high as possible by means of measuring the originals is therefore not achieved.

From the DE-A 3512744, a photometric rotary sensor for translucent originals is known which permits a point-by-point scanning of the original. On the curved shell surface of a rotary cylinder, which carries out a simultaneous rotating motion and linear motion, several light sensors are mounted to which the measuring light is guided by way of light guiding rods which reach up to the picture original. The electric signals of the sensors are received at the rotary cylinder by way of collector rings and are supplied to an electronic storage and analyzing circuit, in which case, by way of corresponding coding elements, every signal arriving in the storage device can be assigned to a fixed measuring point on the original. The point-by-point measuring of the whole picture surface permits a more precise detecting of the color distribution in the original than the integral measuring and, if suitable criteria are used for evaluating the signals, leads to an increased yield of satisfactory first copies. The described sensor device with the combined rotating and linear movement and the receiving of the sensor signals from a rotating sensor support prove relatively expensive and cumbersome, particularly in the case of larger-format originals if the entry surfaces of the light guiding rods are moved along the picture surface in an x-y-movement.

So-called video analyzers are also known which are equipped with a separate measuring light source and furnish a positive control picture of an original on a video screen. They permit a direct evaluation of the visualized picture and the adjustment of the picture color by means of appropriately influencing the signals. Thus a basic calibration is carried out again with respect to a reference original in order to obtain information concerning densitometric differences between the original to be copied and the reference original and to determine from that, in a computing device connected behind it, the adjustments to be carried out at the enlarging or copying apparatus. By means of such a video-analyzing device, good results can be achieved as a rule with respect to satisfactory first copies with respect to the yield. However, the complexity of the system and the connected high expenditures considerably limit the range of application.

SUMMARY OF THE INVENTION

The invention is based on the object of providing an analyzing arrangement for film originals which results in a high yield of satisfactory first copies and, in comparison to the known arrangements, requires lower technical expenditures with correspondingly lower manufacturing costs. In an instrument of the indicated type having an illuminating device for the lighting of the original, a photoelectric sensor device for the color-selective sensing of the measuring light shining through the original, and a signal analyzing device connected behind the sensor device, this object is achieved according to the invention by the combination of the following characteristics:

The illuminating device has a measuring light source, a light condenser, and a Fresnel lens in proximity of the original;

the original is imaged by way of an objective in the measuring plane of the sensor device, in which case, in proximity of the objective, color filters in the colors red, green and blue can selectively be introduced into the path of the rays; and the sensor device has a photodiode line which can be moved in the imaging plane of the objective in a straight line over the original image.

The use of a condenser light source and the additional arrangement of a Fresnel lens close to the film original result in a high light concentration in the area of the original so that a light of limited power is sufficient for illuminating the original with such a light intensity that a measuring of the transmission light can take place without any problems. As a result of the limited power of the light, cooling devices are not required. In addition, by means of the combination of the condenser light source and the Fresnel lens, a uniform lighting of the original can be achieved with a short light path between the light source and the original, which has the advantageous result of a simple and compact design of the illuminating device and of the instrument itself.

Also with respect to the handling of the instrument, the targeted guiding of light proves to be advantageous because the existing light in the open area between the picture platform and the measuring head does not affect the measurement so that, despite the free access to the picture platform, the use of this instrument is possible in a light area. In addition, the targeted condenser light generates little glare.

By means of the use of a photodiode line which extends over a lateral length of the original image, the scanning of the whole original is possible by means of a linear movement of the line in the direction of the other lateral length which results in a simple and inexpensive construction of the scanning arrangement. Preferably, the photodiodes are mounted as individual diodes, in line shape, on a printed circuit board together with components of an amplifier and change-over circuit which is connected behind them, the printed circuit board being movable in a straight line in a plane. The drive of the printed circuit board preferably takes place by means of a step motor in such a manner that the photodiode line sweeps over the projected original picture in a number of successive steps and the resulting measuring signals can clearly be assigned to a respective measuring point.

Additional characteristics and advantageous developments of the invention are set forth in the following description of a preferred embodiment by means of the attached drawings.

DETAILED DESCRIPTION OF THE PREFERRED EMBODIMENT

Figure 1:
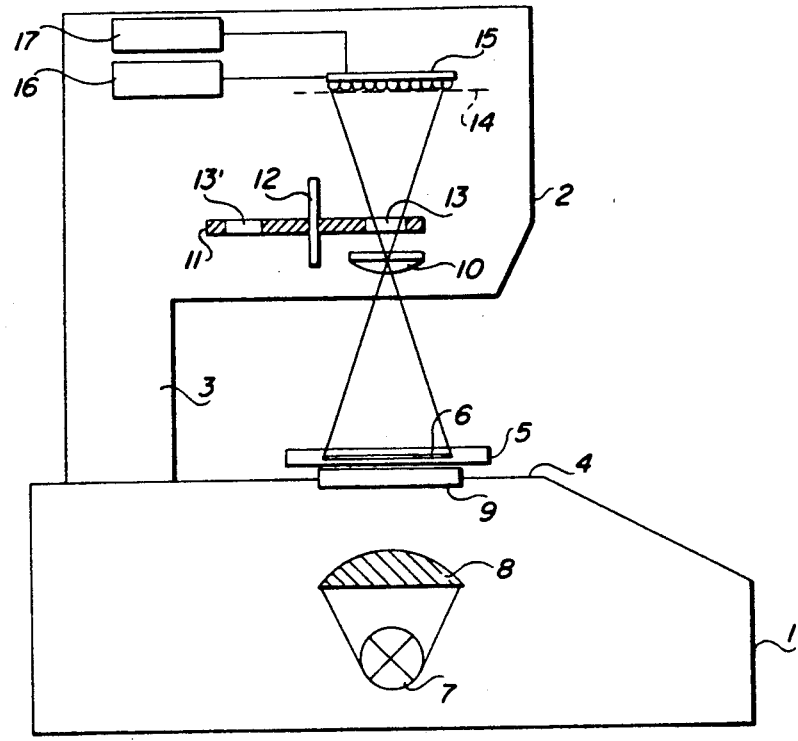
FIG. 1 is a schematic representation of the measuring instrument according to the invention.

As FIG. 1 illustrates, the instrument according to the invention comprises a closed lower housing part 1 which accommodates an illuminating device and an upper part 2 having a device for the measuring of light. Both parts are connected with one another by means of an eccentric support, the arrangement being such that the upper part is held as a light measuring head at a distance from the lower housing part. On the side facing the measuring head, the lower housing part has a working surface 4 in which an picture platform 5 for receiving a film original 6 to be measured and other operating elements are arranged. The picture platform can preferably be detached so that picture platforms can be used for different film formats and can be exchanged among one another. The lower housing part and the measuring head together form a structural unit, a freely accessible working area existing between the two in the area of the picture platform receiving device.

The illuminating device in the interior of the lower housing part 1 comprises a light source 7, a condenser 8, and an additional Fresnel lens 9 in proximity of the picture platform, all in such an arrangement that the film original is uniformly illuminated in the picture platform.

In the upper part 2, the actual light measuring head, an objective 10 is arranged in alignment with the normal center line of the picture platform, this objective 10 sharply imaging in a picture plane 14 the original disposed in the picture platform. A filter plate 11 has color filters 13, 13' and 13" in the colors red, green and blue arranged along a circular line (of which only filters 13 and 13' are visible in the drawing), and can be rotated around a fixed shaft 12 in the center of the circular line in such a manner that the color filters successively one after the other can be introduced individually into the path of the ray of measuring light in proximity of the objective. Another reason why the imaging of the original by way of an optical system with the arrangement of the measuring filters in proximity of the objective is advantageous is that small-surface color filters suffice in this case. A line-shaped photoelectric sensor arrangement, preferably a photodiode line 15, extends in the picture plane along the narrow side of the image and can be linearly moved in the direction of the longitudinal side in such a manner that it sweeps over the whole image of the original. Reference number 16, in general, indicates a motor drive for the linear movement of the photodiode line, and reference number 17 indicates an electronic signal analyzing circuit for the analysis and further processing of the light measuring signals emitted by the photodiodes.

Figure 2:
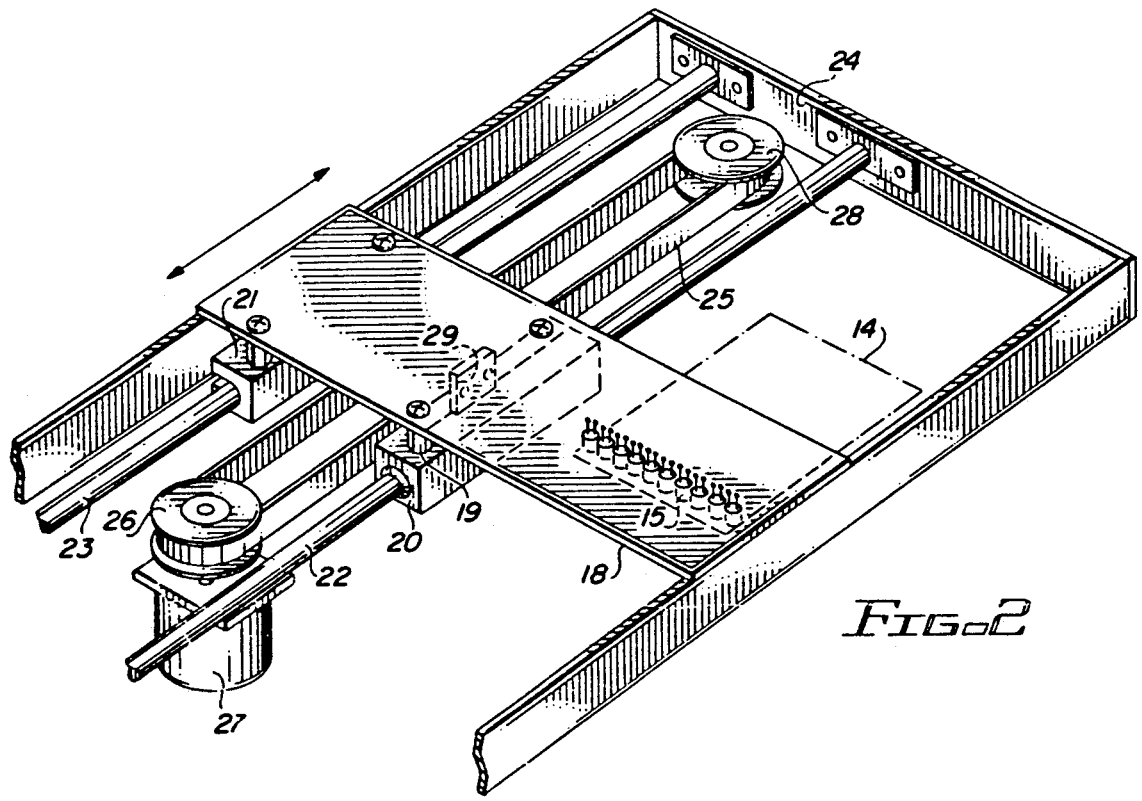
FIG. 2 is a representation of the drive for the linear movement of a photoelectric sensor device of the instrument according to FIG. 1.

FIG. 2 illustrates the driving and moving mechanism of the photodiode line 15 while scanning the measuring surface in a stand-alone position and at a scale that is enlarged in comparison to FIG. 1. A number of photodiodes are mounted in a line shape on a printed circuit board 18 which also accommodates at least some of the electronic components of an amplifier and change-over circuit connected behind them (not shown in the figure). By means of screwed connections 19, the printed circuit board 18 is fastened to two sliding blocks 20 and 21 which are slidingly displaceable on parallel guides 22, 23. At the ends, the guides 22, 23 are held in a frame 24, the arrangement of the guides within the frame and the arrangement of the frame itself in the interior of the measuring head being such that the printed circuit board 18 can be moved in a plane that is in parallel to the picture plane 14, in a normal manner, for the alignment of the photodiode line. A step motor 27 is provided as the drive for the linear movement of the printed circuit board with the photodiode line, a toothed disk 26 being disposed on the shaft of the step motor 27. A toothed belt 25 moves over the toothed disk 26 and a deflecting roller 28 and extends, in the area of the printed circuit board, with which it is fixedly connected by means of a clamped connection 29, in parallel to the guides 22, 23. In this manner, the photodiode line, when the step motor is controlled correspondingly, can be moved step-by-step over the picture surface, whereby the whole surface of the film original is scanned. In this case, the diode line is first moved from a fixed initial position outside the measuring field toward the format-dependent measuring surface in order to recognize the format of the existing film original from the path covered until the illuminated measuring surface is reached.

During the step-by-step movement of the photodiode line along the length of the picture, light measuring values are generated continuously in the individual photodiodes which are each assigned to a certain measuring point on the original. In order to obtain separate measuring values for the red, green and blue component of the measuring light, the original is scanned three times by means of the diode line, in which case, the red, green or blue color filter of the filter plate 11 (FIG. 1) are each turned into the path of the measuring rays. The measuring values which are furnished successively by the individual photodiodes are stored in a storage arrangement of the signal analyzing circuit and, according to a predetermined algorithm, are computed into exposure values. In the case of the instrument in the preferred embodiment, the number of detectable measuring points of an original amounts to, for example, 100 to 130 depending on the format of the original. The large number of light measuring values reflects the actual color distribution in the original to be copied and thus permits a picture-specific calculation of the exposure values.

The computation takes place by means of a microprocessor system which also takes over the necessary control functions, including the motor control for the drive of the photodiode line. The computed exposure values are digitally displayed on a display device. Preferably, the instrument according to the invention also has interfaces for the data output by way of data printers, bar code printers or in the on-line operation in combination with fully automatic enlarging apparatuses. Since it is conceived as an independent instrument, it may be used as a color analyzer in the darkroom as well as a central measuring site in the photolab.

I claim:

1. A measuring instrument for the point-by-point measuring of color originals to be copied for the determination of exposure values, said measuring instrument comprising in combination:
    a. an illuminating device for lighting of a color original, said illumination device including a measuring light source, a light condenser, and a Fresnel lens in proximity of the original to illuminate the color original and to shine rays of measuring light therethrough;
    b. an objective lens disposed in the rays of measuring light to form an image of the color original in a measuring place;
    c. a photoelectric sensor device for the color-selective sensing of measuring light shining through the color original
    d. a signal analyzing device connected to said sensor device for analyzing light measuring signals generated by said sensor device;
    e. red, green and blue color filters in proximity to said objective lens for selective introduction into said path of the rays;
    f. said sensor device including a line of photodiodes disposed in the measuring plane; and
    g. means for moving said line of photodiodes in the measuring plane in a straight line over the image of the color original.

2. A measuring instrument according to claim 1, wherein the photodiode line is part of a printed circuit board in which electronic components are inserted and wherein said means for moving said line of photodiodes includes a motor for moving and guiding said line of photodiodes in a straight line in parallel to the measuring plane.

3. A measuring apparatus according to claim 2, wherein said motor comprises a step motor by means of which said line of photodiodes, in a number of steps of a defined length, is moved over the image of the color original formed in the measuring plane.

4. A measuring apparatus according to claim 3, wherein the sensing of measuring light performed by said photoelectric sensor device takes place in an automatically occurring measuring cycle during which said line of photodiodes successively sweeps over the measuring plane three times, once for each of the colors red, green and blue, and wherein said red, green, and blue color filters are sequentially introduced into the path of the rays of a measuring light, said signal analyzing device further including storage means for separately storing individual measuring values, according to the colors red, green, and blue, for each respective measuring point for the analysis.

5. A measuring apparatus according to claim 3, further including sensing devices for the purpose of format recognition.

6. A measuring apparatus according to claim 1, further including an outer structure, the outer structure having a closed lower housing part and a light measuring head held at a distance above said closed lower housing part which together form a structural unit, the lower housing part accommodating said illuminating device and said light measuring head accommodating said photoelectric sensing device, said measuring instrument further including a receiving device disposed between said closed lower housing part and said light measuring head to provide a freely accessible work area for receiving the color original to be measured.

* * * * *